Sept. 15, 1931.  O. C. WRIGHT  1,823,225
CONTROL FOR FLUID PRESSURE BRAKES
Filed Feb. 7, 1930
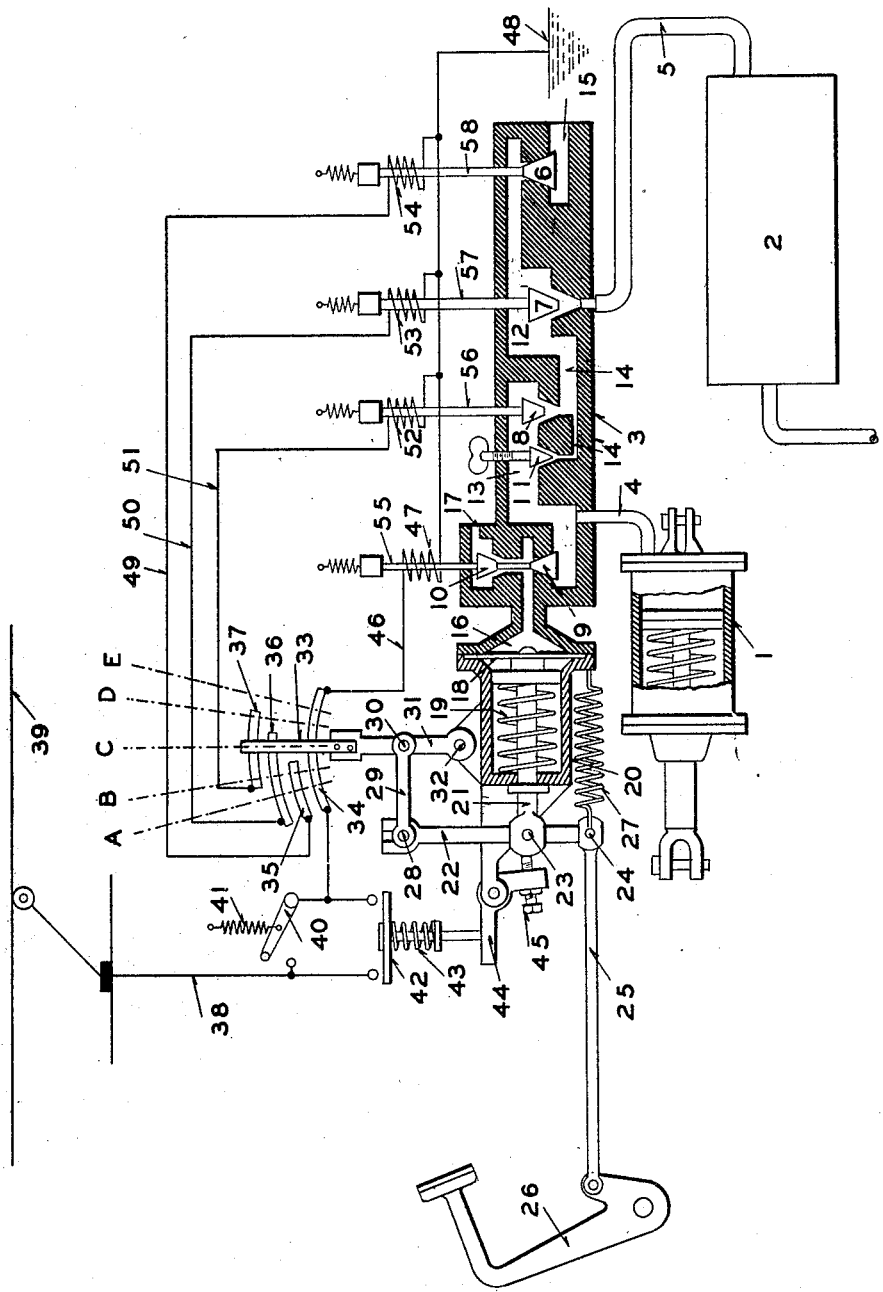
Inventor
Orville C. Wright
By E. C. Huffman
Att'y.

Patented Sept. 15, 1931

1,823,225

UNITED STATES PATENT OFFICE

ORVILLE C. WRIGHT, OF ST. LOUIS, MISSOURI

CONTROL FOR FLUID PRESSURE BRAKES

Application filed February 7, 1930. Serial No. 426,469.

My invention relates to means for controlling fluid pressure brakes, such for example, as are used on electrically operated trains or street cars. The object of my invention is to provide a brake system in which the amount of pressure applied to the brake cylinder will be proportional to the movement of a control lever and in which the pressure will be automatically maintained at the amount determined by the extent of such movement.

The accompanying drawing, which illustrates one embodiment of my invention as applicable to a street car, is a diagrammatic view.

The brake cylinder 1 is applied with compressed air from a reservoir 2 through a valve casing 3 connected to the cylinder and reservoir through pipes 4 and 5, respectively. Contained in the valve casing is a release valve 6, an application valve 7, a restricting valve 8, an emergency pressure valve 9, and an emergency release valve 10, the two latter valves being mounted on a common stem and moving in unison. In addition to these valves, which are moved electrically or otherwise during the application and release of the brake, the casing also contains a choke valve 11 which is manually adjusted and remains in fixed position throughout the operation of the device. Formed in casing 3 are two chambers 12 and 13 communicating with the reservoir and brake cylinder, respectively, and connected by a passage 14 having a restricted by-pass 14'. Communication between the chamber 12 and the reservoir is controlled by valve 7 and between this chamber and an exhaust port 15 by the valve 6. The valve 8 determines whether the communication between chambers 12 and 13 is directly through passage 14 or restricted to by-pass 14'. Valve 9 controls the flow from chamber 13 to a control chamber 16, and valve 10 the flow from the latter chamber to the atmosphere through an exhaust port 17.

Pressure in the chamber 16 acts on a diaphragm 18 to compress a spring 19 in a cylinder 20 and thus forces outwardly a piston rod 21 to the end of which a lever 22 is secured by a pivot pin 23. Pivoted to the lower end of lever 22 by a pin 24 is a connecting rod 25 extending to the operating lever which, as shown, consists of a pedal 26. A spring 27 secured to the connecting rod returns the pedal to normal position when it is released. The upper end of the lever 22 is connected by a pivot pin 28 to one end of a link 29, the opposite end of which is pivoted, by a pin 30, to a lever 31. Lever 31 is pivoted, by pins 32, to a lug on the cylinder 20 and carries a contact arm 33 moving over contact segments 34, 35, 36 and 37.

Segment 34 is connected, by line wire 38, to any suitable source of electrical supply as, for example, the trolley wire 39. Interposed in the line wire 38 is a pilot switch 40 normally held open by a spring 41. A short-circuiting switch 42, when closed, shunts the current around the pilot switch. It is held in open position by a spring 43 and is closed by the action of the bell-crank lever 44 operated by the movement of the piston rod 21. A set screw 45 determines the amount of movement of the rod necessary to close the switch. Segment 34 is also connected by wire 46, including solenoid 47, to ground 48. Segments 35, 36 and 37, are connected by wires 49, 50, and 51, including solenoids 52, 53 and 54, respectively, with wire 46 and hence with ground 48. The solenoids 47, 52, 53 and 54 are adapted, when energized, to move valve stems 55, 56, 57 and 58, respectively, downward. These stems are normally held in raised position by springs or otherwise.

With the parts in the position shown in the drawing, which position will occur after an emergency application of the brake, full reservoir pressure is applied to the brake cylinder while chamber 16 is at atmospheric pressure. To release the emergency application the pilot switch 40 is closed. Current now flows from line 38 to sector 34 and to sectors 36 and 37 connected with it by contact arm 33. Current flows from the sectors to ground through lines 46, 50 and 51 energizing solenoids 47, 52 and 53, thus opening valve 9 and closing valves 7, 8 and 10. The closing of valve 7 cuts off reservoir pressure from chamber 12, closing valve 8 restricts communication between chambers 12 and 13 to the by-pass 14′, the capacity of which is controlled by the choke valve 11. Closing valve 10 cuts off chamber 16 from the atmosphere and opening 9 places it under reservoir pressure contained in chamber 13. This pressure acting on diaphragm 18 forces rod 21 outwardly, moving lever 22 on pin 24 as a pivot. This motion is communicated through link 29 to lever 31 moving contact arm 33 from position C to position A. This opens circuit 51 allowing valve 8 to rise, and closes circuit 49 depressing valve 6. This allows the air to escape rapidly from the brake cylinder through chamber 13, large passage 14, chamber 12, and exhaust port 15 to atmosphere. Pressure is also exhausted from chamber 16 through valve 9 allowing the diaphragm 18 to return to normal position and consequently returning arm 33 to position C, closing valves 6, 7, and 8.

To secure a service application the pedal 26 is partially depressed, moving lever 22 on fulcrum 23 and forcing contact arm from position C to position D. This opens circuit 50 allowing valve 7 to rise, placing the reservoir in communication with the brake cylinder and chamber 16 but only through the choke valve 11 (valve 8 remaining closed) so that the pressure accumulates gradually. As the pressure builds up in chamber 16 the pressure on the diaphragm 18 compresses spring 19 moving lever 22 on pivot 24 until contact arm 33 is returned to position C, when valve 7 will cut off the pressure from the reservoir. The amount of movement and consequent pressure necessary to accomplish this will depend upon the distance which the pedal is depressed to move it into D position. It will be understood that the D, or service position, covers a considerable range of movement of the contact arm 33 in which it is off segment 36 but on segment 37. This range is made sufficient to cover the desired variation in service application pressure. Should air leak from the brake cylinder the pressure will fall, not only in it but also in chamber 16, moving contact arm 33 out of engagement with segment 36 and opening valve 7 until the predetermined pressure is again built up. It will be seen that the amount of pressure with which the brake is applied is in proportion to the depression of the pedal and that this predetermined pressure is automatically maintained notwithstanding leakage in the system.

When the piston rod 21 is forced outwardly it moves the bell-crank lever 44 to close the short-circuiting switch 42 so that the pilot switch 40 may be released (with resultant automatic opening by spring 41) without securing emergency application, as would otherwise occur. The exact point in the movement of the rod at which this occurs, may be determined by adjusting the set screw 45.

If maximum application is desired the pedal is depressed to its limit, moving contact 33 into E position. This opens valve 8, allowing the air to be applied suddenly instead of gradually. Otherwise the operation is the same as above described.

When the pedal is released to decrease the pressure in the brake cylinder, connecting rod 25 is drawn back by spring 27 moving lever 22 on pin 23, thus engaging contact arm 33 toward the left. If the pedal is only partially released the arm will be moved into position B, opening release valve 6 by contact with segment 35 but retaining valve 8 in closed position by contact with segment 37, so that the air will be slowly discharged through by-pass 14′. If, however, the pedal is fully released the contact arm will be moved into position A, opening valve 8 in addition to valve 6, so that the air will be rapidly discharged directly through passage 14.

It will be seen that my brake not only automatically holds the braking pressure at any desired amount determined by the movement of the operating lever but all the functions of service and emergency application, as well as slow and rapid release, are secured by a simple movement of said lever. Further, the arrangement is such that in case the brake is not applied, and the short-circuiting device 42 consequently open, an emergency application will be automatically secured upon the release of the pilot switch. This result will also be secured upon the failure of the valve operating current from any cause.

While I have shown the valves as electrically actuated, which is convenient when the device is used in connection with an electrically driven vehicle, they may be operated by other means, such as mechanical connections or fluid pressure devices. Many other changes may also be made in the details of construction without departing from my invention.

Having fully described my invention, what I claim as new and desire to secure by Letters Patent of the United States is:

1. In a device of the class described, the combination with a brake cylinder, of a source of fluid supply therefor, supply and release valves controlling the admission to and exhaust of fluid from said cylinder, a restricting valve interposed between the supply valve and cylinder, a control chamber communicating with said cylinder, a valve controlling said communication, and means governed by the pressure in said control chamber for operating said supply, release, and restricting valves.

2. In a device of the class described, the combination with a brake cylinder, of a source of fluid pressure therefor, a supply valve between said cylinder and source, a release valve for the cylinder, a control chamber communicating with the cylinder, a valve governing said communication, a member actuated by the pressure in said control chamber, an operating member, a lever pivoted to said pressure actuated member and to said operating member, electrical valve controlling devices operated from said lever, a pilot switch, and a short-circuiting device for said pilot switch also operated from said lever.

3. In a device of the class described, the combination with a brake cylinder, of valves controlling the supply of fluid to and exhaust thereof from said cylinder, solenoids controlling said valves, switching mechanism for said solenoids, a control pressure chamber communicating with the brake cylinder, valves for said control pressure chamber, a solenoid for said later named valves, a pilot switch permanently in circuit with said latter named solenoid, a member movable by the pressure in said control chamber, a manually operated member, and a lever having a double fulcrum, said lever being connected with both said members and governing said switching mechanism.

4. In a device of the class described, the combination with a brake cylinder, of valves controlling the supply of fluid to and exhaust thereof from said cylinder, solenoids controlling said valves, switching mechanism for said solenoids, a control pressure chamber communicating with the brake cylinder, valves for said control pressure chamber a solenoid for said latter named valves, a pilot switch permanently in circuit with said latter named solenoid, a shunt switch for said pilot switch, a member movable by the pressure in said control chamber and actuating said shunt switch, a manually operable member, and a lever having a double fulcrum, said lever being connected with both said members and governing said switching mechanism.

5. In a device of the class described, the combination with a brake cylinder, of valves controlling the supply of fluid to and exhaust thereof from said cylinder, solenoids controlling said valves, switching mechanism for said solenoids, a control pressure chamber communicating with the brake cylinder, valves for said control pressure chamber, a solenoid for said latter named valves, a pilot switch permanently in circuit with said latter named solenoid, a member movable by the pressure in the control chamber, a manually operable member, and means operable by the resultant of the movement of said members for governing said switching mechanism.

6. In a device of the class described, the combination with a brake cylinder, of a fluid pressure supply therefor, electromagnetically actuated application and release valves controlling the flow of fluid to and from said brake cylinder, a fluid pressure controlled member communicating with the brake cylinder, an electromagnetically actuated emergency pressure valve controlling said communication, an operator controlled lever connected with said pressure controlled member, an emergency circuit, and current distributing means in said circuit and operated from said lever to control said valves, whereby service application is automatically maintained at a predetermined amount.

7. In a device of the class described, the combination with a brake cylinder, of a fluid pressure supply therefor, application and release valves controlling the flow of fluid to and from said brake cylinder, said application valve being biased toward open and said release valve toward closed position, a fluid pressure controlled member communicating with the brake cylinder, an emergency pressure valve controlling said communication, said valve being biased toward closed position, and operator controlled lever connected with said pressure controlled member, and valve actuating means operated from said lever.

8. In a device of the class described, the combination with a brake cylinder, of a fluid pressure supply therefor, electromagnetically actuated application and release valves controlling the flow of fluid to and from said brake cylinder, said application valve being biased toward open and said release valve toward closed position, a fluid pressure controlled member communicating with the brake cylinder, an electromagnetically actuated emergency pressure valve controlling said communication, said valve being biased toward closed position, an operator controlled lever connected with said pressure controlled member, and emergency circuit, and circuit distributing means in said circuit and operated from said lever to control said valves, whereby service application is automatically maintained at a predetermined amount and emergency application is secured upon interruption of the energizing circuit.

In testimony whereof, I hereunto affix my signature, this 4th day of February, 1930.

ORVILLE C. WRIGHT.